United States Patent [19]
Michel

[11] 3,800,598

[45] Apr. 2, 1974

[54] METHOD FOR EXAMINING THE INNER SURFACE OF A HOLLOW MEMBER

[75] Inventor: Eberhard Michel, Boxdorf, Germany

[73] Assignee: Siemens Aktiengesellschaft, Munich, Germany

[22] Filed: Nov. 9, 1972

[21] Appl. No.: 304,920

[30] Foreign Application Priority Data
Nov. 10, 1971  Germany............................ 2155812

[52] U.S. Cl.................................... 73/104, 73/167
[51] Int. Cl. ........................................... G01n 19/08
[58] Field of Search...................... 73/104, 105, 167

[56] References Cited
UNITED STATES PATENTS
3,662,592  5/1972  Geisler................................. 73/104

FOREIGN PATENTS OR APPLICATIONS
977,502  12/1964  Great Britain........................ 73/104

*Primary Examiner*—S. Clement Swisher
*Attorney, Agent, or Firm*—Kenyon & Kenyon Reilly Carr & Chapin

[57] ABSTRACT

A method of examining the inner surface of a hollow member is disclosed. The method includes inserting a test body into the hollow member and pressing the test body against the inner surface of the hollow member at a temperature sufficient to cause at least the surface of the test body to deform whereby a relief of the inner surface of the hollow member is obtained.

An apparatus for performing the method of the invention is also disclosed. The apparatus includes the test body and a pressure generating device for developing the pressure needed to press the test body against the inner surface of the hollow member.

2 Claims, 2 Drawing Figures

METHOD FOR EXAMINING THE INNER SURFACE OF A HOLLOW MEMBER

BACKGROUND OF THE INVENTION

The invention relates to a method of examining the inside surface of a hollow member and an apparatus for performing the method.

For evaluating the quality of a hollow member such as a tube, the condition of the surface of the tube among other things, is of great importance. While it is easy to judge the exterior surface, the interior surface can in general be evaluated only inadequately. This problem arises, for example, when the condition of the heat exchanger pipes in steam generators for water pressure reactors must be examined in the event a leak occurs.

SUMMARY OF THE INVENTION

It is an object of the invention to provide a method of examining the inner surface of a hollow member. It is another object of the invention to provide such a method for obtaining a relief of the inner surface of a hollow body such as a tube or the like.

It is still another object of the invention to provide an apparatus for performing the method of the invention.

The method includes as a feature the step of inserting a test body into the hollow member and then pressing the test body against the inner surface of the hollow member at a temperature sufficient to cause at least the surface of the test body to deform whereby a relief of the inner surface of the hollow member is obtained.

The surface of the test body can plastically deform so that an image in relief fashion is embossed in the surface of the test body. This permits an observer to evaluate the condition of the inside surface of the hollow member. The test body can be pressed against the hollow member by means of a warm fluid such as warm compressed air or a warm liquid under pressure.

The apparatus for examining the inner surface of a hollow member includes as a feature a hollow test body which has an outer surface and is insertable into the hollow member. Pressure means in the form of a pressure generating device is connected to the hollow test body for applying a pressure thereto to press the outer surface thereof tightly against the inner surface of the hollow member at a temperature sufficient to cause at least the outer surface of the test body to deform an amount sufficient to form a relief of the inner surface of the hollow member therein. The pressure generating equipment can fill the test body with a warm medium or cause the warm medium to flow through the test body. Or, the hollow member to be examined can be heated for obtaining the required temperature.

According to another feature of the invention, the test body can be made of plastic. It is preferable to use a test body which is hollow and is fitted to the inside surface of the hollow member as well as to which pressure can be applied. If the hollow member is a tube, it is advantageous to use a hose as the test body.

By means of the plastic deformation of the surface of the test body, a reproduction of the inside surface of the hollow member is obtained. If, for example, the inside surface of a hollow member in the form of a tube is imaged in relief on the outside surface of a hose as the test body, the inside surface can be evaluated without difficulty. Even with poor accessibility, a defect can be made visible if it is situated on the inside of the tube, or else, it is possible to show that the damage is on the outside of the tube. With the method and apparatus according to the invention, a rapid, inexpensive and simple test of the entire surface of a hollow body, especially of the inside surface, is possible. The examination is extremely reliable. It is also important that it can be applied to interiors of hollow members of irregular shape, for example, to bent tubes.

Although the invention is illustrated and described herein as a method and apparatus for examining the inner surface of a hollow member, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
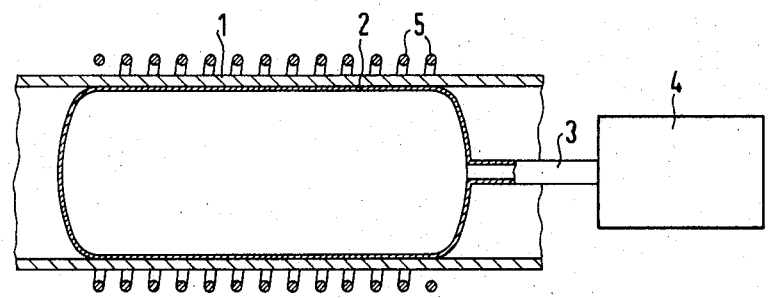
FIG. 1 is a schematic diagram, partially in section, of the apparatus of the invention. The test body of the apparatus is shown inserted in the hollow member under examination as required according to the method of the invention.

FIG. 1 shows a cross-section of a tube 1 to be examined into which a test body in the form of a flexible hose 2 has been introduced. The hose 2 is connected by a connecting line 3 with a pressure-generating device 4 which serves as a pressure means for applying pressure to the test body. A source of compressed air or a source of a liquid such as water under pressure can be used as the pressure-generating device 4. The pressure means thus comprises fluid supply means for supplying fluid to the test body to fill the same under pressure.

The outside diameter of the hose or hose-like bag 2 introduced into the tube 1 is somewhat smaller than the inside diameter of the tube. The hose 2 is filled by the pressure-generating device with a medium at defined pressure.

Figure 2:
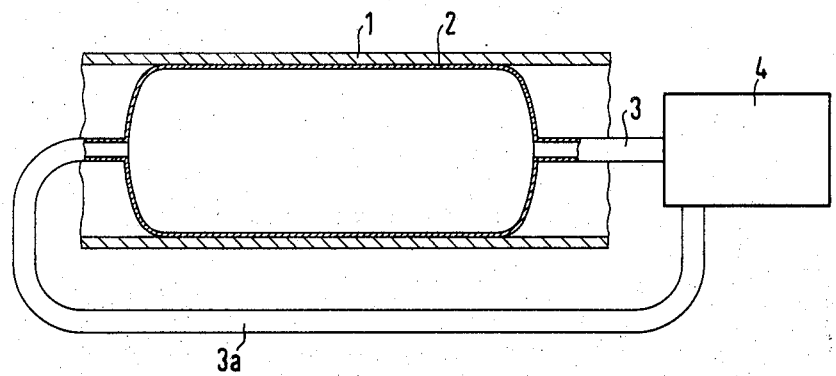
FIG. 2 is a schematic diagram, also partially in section, showing an alternate embodiment of the invention wherein the medium under pressure used to press the test body against the inside surface of the hollow member is passed through the test body.

According to another embodiment shown in FIG. 2, the pressure-developing medium can flow through the hose 2. A closed circuit can be established by utilizing a connecting line 3a. The hose 2 is firmly pressed against the inside wall of the tube. The pressure-developing medium is heated to a temperature at which the material of the hose is plastically deformed. Or, the tube can be heated to the temperature required for deformation by means of a separate heating arrangement, for example, by heating means in the form of an induction coil 5 as in the case where the tube 1 is made of steel. As a hose material, a plastic such as soft polyvinylchloride (PVC) is particularly well suited, because when cold it is inherently elastically deformable and this permits the hose to be pulled from the inside of the tube and inspected. At the required temperature and pressure, the inside surface of the tube 1 is imaged exactly on the surface of the hose. Thereafter, with cooling, this plastic is changed to its normal elastically deformable, non-moldable form.

A straight section of tube 1 is shown in the FIGS. The test according to the invention of the inside surface of the tube can of course also be performed in the case of a bent tube wherein a flexible hose or bag is used as the test body.

What is claimed is:

1. A method for examining the inner surface of a tubular member by inserting an inflatable tubular test body in said member and inflating said body, and then after removing said body from said member, inspecting the surface of said body; wherein the improvement comprises inserting in said member a tubular test body that is inflatable and made of a plastic that is plastically moldable under pressure and can be changed to an elastically deformable form, inflating said plastic body while it is plastically moldable so its surface is molded with a relief of the inner surface of said member, and thereafter changing said plastic of said plastic body to its said elastically deformable form so that said plastic body can be removed from said member for inspection of the relief obtained on the surface of the plastic test body.

2. The method of claim 1 in which said plastic is soft polyvinylchloride and is heated to its plastically moldable form while said test body is inflated, and is by cooling changed to its normal elastically deformable form.

* * * * *

UNITED STATES PATENT OFFICE
CERTIFICATE OF CORRECTION

Patent No. 3,800,598　　　　　　　　　Dated　April 2, 1974

Inventor: Eberhard Michel

It is certified that error appears in the above-identified patent and that said Letters Patent are hereby corrected as shown below:

In the Foreign Application Priority Data change the file number of the German application upon which the claim for priority is based from "2155812" to -- P 21 55 812.3 --

Signed and sealed this 9th day of July 1974.

(SEAL)
Attest:

McCOY M. GIBSON, JR.　　　　　　　　C. MARSHALL DANN
Attesting Officer　　　　　　　　　　Commissioner of Patents